United States Patent
Fields

(10) Patent No.: US 9,195,046 B2
(45) Date of Patent: Nov. 24, 2015

(54) PROTECTIVE MAGNIFICATION FILM FOR ELECTRONIC DEVICES

(71) Applicant: Reta Fields, St. Albans, NY (US)

(72) Inventor: Reta Fields, St. Albans, NY (US)

(*) Notice: Subject to any disclaimer, the term of this patent is extended or adjusted under 35 U.S.C. 154(b) by 0 days.

(21) Appl. No.: 14/258,220

(22) Filed: Apr. 22, 2014

(65) Prior Publication Data
US 2015/0301330 A1  Oct. 22, 2015

(51) Int. Cl.
*G02B 27/02* (2006.01)
*G02B 25/00* (2006.01)
*G02B 1/04* (2006.01)

(52) U.S. Cl.
CPC .............. *G02B 25/008* (2013.01); *G02B 1/041* (2013.01)

(58) Field of Classification Search
CPC .............................. G02B 25/008; G02B 1/041
See application file for complete search history.

(56) References Cited

U.S. PATENT DOCUMENTS

2002/0037703 A1* 3/2002 Hirota et al. ................... 455/90

* cited by examiner

*Primary Examiner* — Joseph P Martinez
(74) *Attorney, Agent, or Firm* — Gulf Coast Intellectual Property Group

(57) ABSTRACT

A protective film for a cellular phone screen that is operable to protect the screen and further functions to provide image magnification of images displayed on the screen. The protective film further includes a body that is generally planar in manner having four contiguous walls operable to define an interior volume. Disposed within the interior volume are a first lens and a second lens. The first lens and the second lens are configured in a bi-convex arrangement. The body further includes disposed on one side thereof a pressure sensitive adhesive that is operable to releasably secure the protective film to a screen of a cellular phone.

20 Claims, 1 Drawing Sheet

PROTECTIVE MAGNIFICATION FILM FOR ELECTRONIC DEVICES

PRIORITY UNDER 35 U.S.C SECTION 119(e) & 37 C.F.R. SECTION 1.78

This nonprovisional application claims priority based upon the following prior U.S. Provisional Patent Application entitled: Optical Screen Protector, Application No. 61/815,653, filed Apr. 24, 2013, in the name of Reta Fields, which is hereby incorporated by reference for all purposes.

FIELD OF THE INVENTION

The present invention relates generally to protective films, more specifically but not by way of limitation, a protective film for a screen on a personal electronic such as but not limited to cellular phones wherein the film further provides magnification of the images being displayed on the screen.

BACKGROUND

Personal electronics have saturated our society and have become indispensable tools relied on by millions of individuals on a daily basis. One personal electronic that is now utilized on a daily basis by over three-quarters of the United States is the cellular telephone. Whether it is a smart phone that has data capabilities or a conventional cellular telephone, these devices are relied on by many to stay in communication with others at any given time.

One problem with conventional cellular phones and smart phone is that they are manufactured with screens using glass. Most smart phones and other cellular phones utilize an aluminosilicate glass or similar type of material to make the screens. While this glass provides the required functionality for the cellular phone itself, it is susceptible to damage from fingerprint oils and other items. Many users will utilize a plastic, polyethylene film, superposed on the glass screen of the cellular phone to provide protection of the glass screen of the cellular phone. While this conventional film provides protection of the glass screen of the cellular phone it fails to address another issue with the use of cellular phones.

The population in the United States is an aging population. The generation known as the baby-boomers are reaching the age of 65 at a rate of over 10,000 per day. This generation utilizes cellular phones on a regular basis. A common medical condition for individuals over the age of 45 is presbyopia. This is a common degenerative eye condition wherein the individual requires printed images to be magnified in order to read the printed images. It is common for an individual to utilize reading glasses to achieve a 1.5× or more magnification in order to see certain printed images. In addition to older individuals, utilization of reading glasses amongst younger individuals is also increasing.

Conventional protective films for cellular phones do not provide magnification of the images on the screen of the cellular phone.

Accordingly, there is a need for a protective film for a cellular phone screen that further provides magnification of the images displayed on the screen of the cellular phone.

SUMMARY OF THE INVENTION

It is the object of the present invention is to provide a protective film for the screen of a cellular phone that further provides magnification of the images displayed on the screen.

Another object of the present invention is to provide a protective film for a cellular phone that magnifies images displayed on the screen that is flexible.

A further object of the present invention is to provide a protective film for a cellular phone that magnifies images displayed on the screen that is scratch resistant.

Still another object of the present invention is to provide a protective film for a cellular phone screen that provides magnification that includes a body that is planar in manner having an interior volume.

Still an additional object of the present invention is to provide a protective film for a cellular phone screen that provides image magnification that includes a first lens and a second lens disposed within the interior volume of the body.

Yet a further object of the present invention is to provide a protective film for a screen of a cellular phone that provides image magnification wherein the first lens and the second lens are biconvex in configuration.

An additional object of the present invention is to provide a protective film for a cellular phone screen that provides image magnification wherein the first lens and second lens are manufactured from a flexible material.

Another object of the present invention is to provide a protective film for a cellular phone screen that provides image magnification wherein the body further includes a pressure sensitive adhesive on one side thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
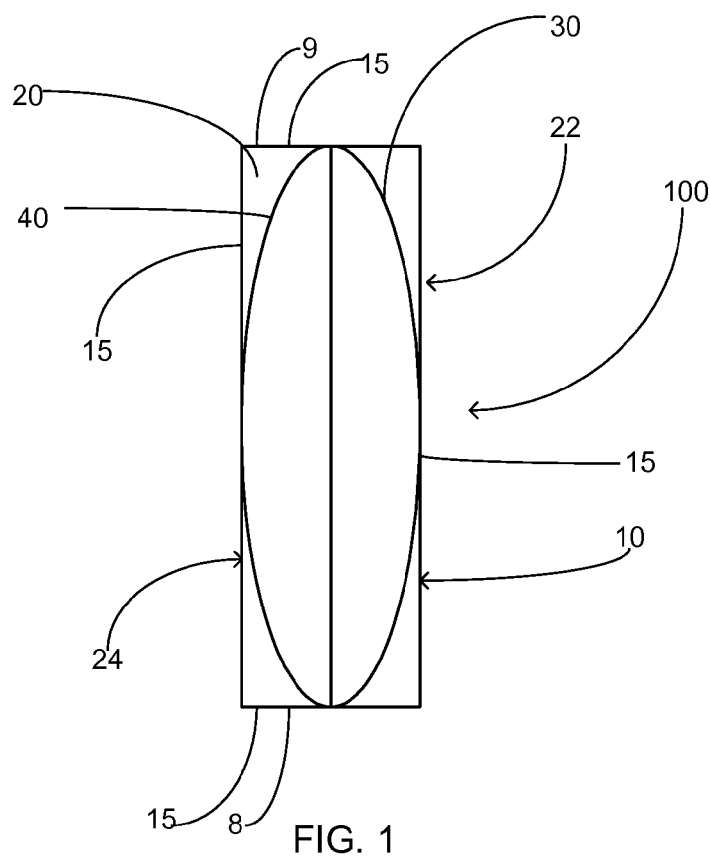
FIG. 1 is a cross-sectional view of the present invention.
Figure 2:
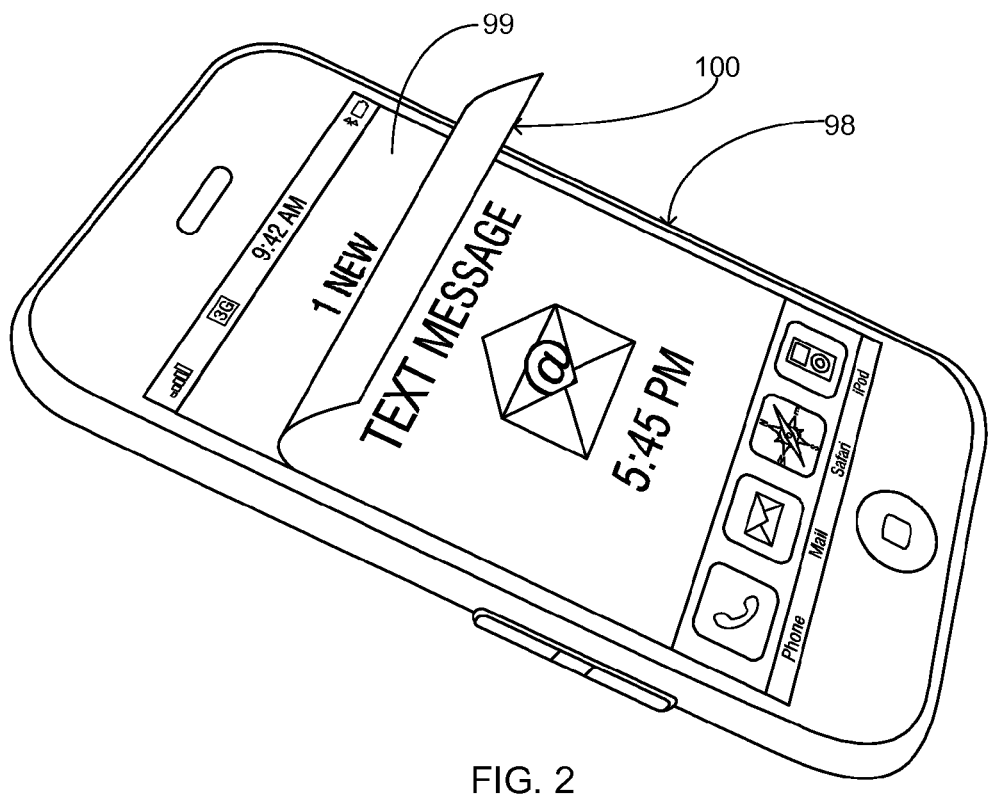
FIG. 2 is a perspective view of the present invention releasably secured to an exemplary cellular phone.

Referring now to the drawings submitted herewith, wherein various elements depicted therein are not necessarily drawn to scale and wherein through the views and figures like elements are referenced with identical reference numerals, there is illustrated a protective film 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring to the drawings submitted herewith the protective film 100 further includes a body 10. The body 10 of the protective film 100 is manufactured from a plurality of walls 15 that are contiguously formed so as to create a square or rectangular shape. The walls 15 are manufactured from a suitable durable flexible and translucent material such as but not limited to polyethylene sheets. The walls 15 are further configured to be scratchproof. The walls 15 form the interior volume 20 for the body 10. The body 10 is planar in manner and is manufactured to have a thickness of no more than three millimeters. The walls 15 of the body 10 are further operable to be flexible and scratchproof so as to provide no distortion for the text being viewed therethrough as subsequently described herein. The walls 15 are integrally formed to create the body 10 utilizing suitable durable techniques. Those skilled in the art will recognize that the walls 15 could be manufactured from numerous different types of plastic in order to achieve the desired objectives as described herein. Furthermore, while the body 10 is taught in its preferred embodiment to be square or rectangular in shape, it is contemplated within the scope of the present invention that the body 10 could be formed in numerous different shapes. The exterior shape of the body 10 in its preferred embodiment is sized and shaped so as to be superposed a screen of a plurality of types of cellular phones. The body 10 includes a lower surface 22 and an upper surface 24. The lower surface has disposed at least partially thereon a pressure sensitive adhesive so as to releasably secure the body 10 to an exemplary screen 99 of a cellular phone 98. The pressure sensitive adhesive disposed on the lower surface substantially inhibits the body 10 from moving subsequent its securing to the exemplary screen 99. Those skilled in the art will recognize that numerous types of pressure sensitive adhesives could be disposed on the lower surface 22.

Disposed within the interior volume of the body 10 are a first lens 30 and a second lens 40. The first lens 30 and second lens 40 extend across the length of the body 10 intermediate the first end wall 8 and the second end wall 9. The first lens 30 and second lens 40 are manufactured from a suitable durable, flexible and translucent plastic. The first lens 30 and the second lens 40 are configured in a bi-convex arrangement. The bi-convex arrangement of the first lens 30 and second lens 40, are operable to provide a different focal point for a user's eyes and thus make the text images on the exemplary screen 99 larger or magnified so as to enable those with difficulty viewing smaller fonts to be able to read the text on the exemplary screen 98. The radius of the first lens 30 and second lens 40, are varied so as to provide different focal points, i.e. magnification of the text images on the exemplary screen 99. While no particular magnification is required, good results have been achieved manufacturing a protective film 100 that provides a magnification range between 1.5× and 3×. Those skilled in the art will recognize that the protective film 100 could be manufactured to provide magnification of text images displayed on the exemplary screen 99 at various different levels.

Referring to the drawings submitted herewith, a description of the operation of the protective film 100 is as follows. In use, a user will remove the protective film 100 from packaging and place the lower surface 22 adjacent to the exemplary screen 99 of the cellular phone 98. The protective film 100 is manufactured in a variety of sizes and shapes so as to accommodate exemplary screens 99 of numerous different types of cellular phones. Subsequent the body 10 being superposed the exemplary screen 99, a user will apply a slight pressure to the upper surface 24 of the body 10 so as to activate the pressure sensitive adhesive disposed on the lower surface 22 thereby releasably securing the body 10 to the exemplary screen 99. Ensuing the placement of the protective film 100 over the exemplary screen 99, the text images displayed on the exemplary screen 99 will be magnified within the range of 1.5× to 3×. While a preferred embodiment of the protective film 100 has been disclosed herein as being operable to be releasably secured to an exemplary screen 99 of a cellular phone 98, it is contemplated within the scope of the present invention that the protective film 100 could be utilized on numerous different types of personal electronics.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A protective film for a screen of an personal electronic comprising:

a body, said body being planar in manner, said body having a plurality of walls forming an interior volume, said body being manufactured from a translucent and flexible material, said body having a first side and a second side, said first side of said body being against a display screen of a cellular phone subsequent the protective film being operably coupled to a cellular phone;

a first lens, said first lens being manufactured from a flexible material, said first lens being translucent, said first lens being disposed within said interior volume of said body;

a second lens, said second lens being manufactured from a flexible material, said second lens being translucent, said second lens being disposed within said interior volume of said body; and wherein said first lens and said second lens are arranged in a bi-convex configuration.

2. The protective film as recited in claim 1, wherein said first lens and said second lens are operable to provide magnification of text images displayed on the personal electronic.

3. The protective film as recited in claim 2, wherein said first lens and said second lens are operable to provide magnification of text images displayed on the screen of the personal electronic within the range 1.5× to 3×.

4. The protective film as recited in claim 3, wherein said body further includes and upper surface and a lower surface.

5. The protective film as recited in claim 4, and further including a layer of pressure sensitive adhesive, said pressure sensitive adhesive being disposed on said lower surface of said body.

6. The protective film as recited in claim 5, wherein the body is manufactured from a scratchproof material.

7. The protective film as recited in claim 6, wherein said body is manufactured having a thickness no greater than three millimeters.

8. A protective film for a screen of a cellular phone comprising:

a body, said body being planar in manner, said body having four contiguous walls integrally formed, said body having an interior volume, said body being manufactured from a flexible and translucent material, said body having an outer surface and an inner surface, said four contiguous walls including a first end wall and a second end wall, said inner wall being adhered against a cellular phone screen ensuing placement of the protective film on a cellular phone;

a first lens, said first lens being disposed within said body, said first lens being manufactured from a flexible translucent material;

a second lens, said second lens being disposed within said interior volume of said body, said second lens being manufactured from a flexible translucent material; and wherein said first lens and said second lens are configured in a bi-convex arrangement so as to provide magnification of text images on a cellular phone subsequent the protective film being superposed thereon.

9. The protective film as recited in claim 8, wherein said inner surface of said body includes a pressure sensitive adhesive disposed thereon, said pressure sensitive adhesive being at least partially disposed on said inner surface of said body.

10. The protective film as recited in claim 9, wherein said body is manufactured to a thickness that is no greater than three millimeters.

11. The protective film as recited in claim 10, wherein said body is further manufactured from a scratchproof material.

12. The protective film as recited in claim 11, wherein the protective film is operable to provide magnification of text images displayed on a screen of a cellular phone wherein the protective film has been superposed thereto within and including a magnification range of 1.5× to 3.0×.

13. The protective film as recited in claim 12, wherein said body is square in shape.

14. The protective film as recited in claim 13, wherein said body is manufactured from plastic.

15. A protective film that is operable to be releasably secured to a screen of a cellular phone wherein the protective film functions to protect the screen of the cellular phone and provide magnification of text images displayed thereon comprising:

a body, said body being planar in manner, said body having four contiguous walls integrally formed, said four contiguous walls of said body defining an interior volume, said body being manufactured from a flexible and translucent plastic, said four contiguous walls including a first end wall, a second end wall, an outer wall and an inner wall, said inner wall being flat intermediate said first end wall and said second end wall, said inner wall contacting a screen of a cellular phone subsequent to the protective film being releasably secured to a cellular phone;

a first lens, said first lens being disposed within the interior volume of said body, said first lens being manufactured from a flexible translucent plastic;

a second lens, said second lens being disposed within said interior volume of said body, said second lens being manufactured from a flexible translucent plastic; and wherein said first lens and said second lens are configured in a bi-convex arrangement.

16. The protective film as recited in claim 15, wherein said inner wall further includes an adhesive layer at least partially disposed thereon, said adhesive layer being manufactured from a pressures sensitive adhesive.

17. The protective film as recited in claim 16, wherein said body is scratchproof.

18. The protective film as recited in claim 17, wherein said first lens and said second lens are operable to provide image magnification of images displayed on a screen of a cellular phone within the range of 1.5× to 3.0×.

19. The protective film as recited in claim 18, wherein said body is manufactured having a thickness no greater than three millimeters.

20. The protective film as recited in claim 19, wherein said body is square in shape.

* * * * *